United States Patent

[11] 3,631,718

[72] Inventors Tetsuya Sato
No. 34 4-Chome, Hirano, Shinga-cho, Ibo-gun;
Haruo Miyatake, No. 2417 Kaneoka-cho, Sakai; Osamu Kato, No. 50, 2-Chome, Natsato-cho, Nishujodogawa-ku, Osaka all of Japan
[21] Appl. No. 54,823
[22] Filed July 14, 1970
[45] Patented Jan. 4, 1972
[32] Priority July 24, 1969
[33] Japan
[31] 44/69803

[54] ELECTROMAGNETIC FLOWMETER
3 Claims, 4 Drawing Figs.
[52] U.S. Cl. .................................................. 73/194 EM
[51] Int. Cl. ..................................................... G01p 5/08
[50] Field of Search ......................................... 73/194 EM;
310/11; 417/50

[56] References Cited
UNITED STATES PATENTS
2,149,847  3/1939   Kolin .............................. 73/194 EM
2,907,207  10/1959  Rinia .............................. 73/194 EM
3,095,744  7/1963   Hutchins et al. ................. 73/194 EM
3,339,410  9/1967   Steru .............................. 73/194 EM Primary Examiner—Charles A. Ruehl
Attorney—Stevens, Davis, Miller & Mosher ABSTRACT: An electromagnetic flowmeter comprising a conduit of nonmagnetic material for passing therethrough a liquid to be measured, a permanent magnet of cylindrical shape mounted on the outer circumferential surface of said conduit in concentric relationship, two radial openings formed in two positions diametrically opposed to each other on said permanent magnet in substantially the central portion axially of the magnet, two electrodes mounted in said two radial openings respectively, and external magnetic field shield means mounted around said permanent magnet in enclosing relationship.

PATENTED JAN 4 1972     3,631,718

T. SATO,
H. MIYATAKE
AND O. KATO
INVENTORS

BY Stevens, Davis, Miller, & Mosher
ATTORNEYS

ELECTROMAGNETIC FLOWMETER

This invention relates to flowmeters for measuring the rate of flow of a liquid metal. More particularly, the invention is concerned with an electromagnetic flowmeter adapted for use in measuring the flow rate of mercury when caustic soda is produced by electrolysis of the mercury method.

Present practice in the determination of a flow rate of mercury passed through an electrolytic cell used for producing caustic soda by electrolysis of the mercury process requires collection of specimens of mercury from the upper portion and lower portion of the cell for determining the flow rate by calculation from a variation in the concentration of amalgam of sodium and the electric current used for electrolysis. There are individual variations in the values obtained by this method, and the process requires additional labor and is time consuming. The results obtained by this process is ±5 percent accurate. In special cases, a process using a triangular weir or a square weir is employed but this is not practical because expensive mercury is consumed in large quantities. A flowmeter of the orifice differential pressure-type has a disadvantage in that a slight wear caused by a flow of mercury markedly lowers the accuracy of results, so that it is not fit for use in commercial operation.

Electromagnetic flowmeters of the prior art have a disadvantage in that they have a high rate of occurrence of leakage flux. They are large in size and consequently heavy in weight.

The present invention obviates the aforementioned disadvantages of electromagnetic flowmeters of the prior art.

Accordingly, the present invention has as its object the provision of an electromagnetic flowmeter which is highly accurate and dependable in measuring operation, solid in structure, and low in cost.

Additional objects as well as features and advantages of the invention will be evident from the description set forth hereinafter when considered in conjunction with the accompanying drawing, in which.

Figure 1:
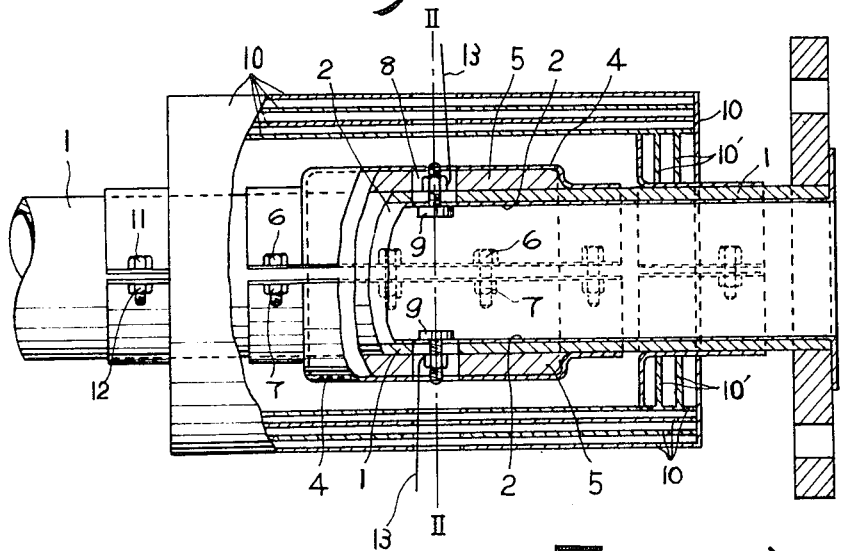
FIG. 1 is a front view, with certain parts being cut out, of the electromagnetic flowmeter embodying the present invention.
Figure 2:
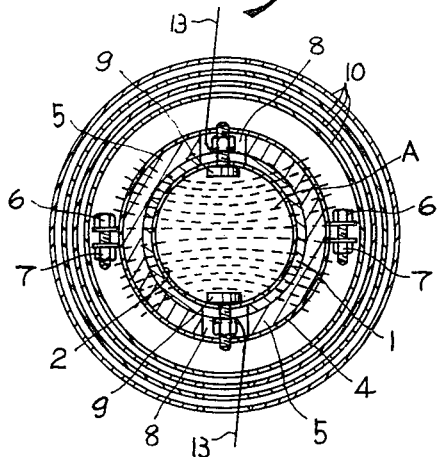
FIG. 2 is a sectional view taken along the line II—II of FIG. 1.

An embodiment of the present invention will now be explained with reference to the accompanying drawing. In FIG. 1 and FIG. 2, the electromagnetic flowmeter according to this invention comprises a conduit 1 made of nonmagnetic metal for passing a stream of liquid metal therethrough which has a lining 2 of a corrosion resistant electrically insulating material. A permanent magnet 5 made in one piece in cylindrical shape or two pieces each in semicylindrical shape is mounted on the outer circumferential surface of the conduit 1 in concentric relationship and held in place by a retainer frame 4 of a nonmagnetic material which is secured to the outer circumferential surface of the magnet 5 by bolts 6 and nuts 7. The permanent magnet 5 is formed with two radial openings 8, 8 disposed in positions diametrically opposed to each other in substantially the central portion axially of the magnet. Two electrodes 9, 9 are mounted in the openings 8, 8 respectively. External magnetic field shield means 10 comprising a number of cylindrical shields made of soft steel is mounted around the permanent magnet 5 in enclosing relationship in such a manner that the cylindrical shields are disposed concentrically with the magnet 5 and with each other with a small clearance being disposed between the cylindrical shields. The external magnetic field shield means 10 is secured to the conduit 1 by bolts 11 and nuts 12. Another external magnetic field shield means 10' comprising a number of annular shields is mounted at opposite ends of the cylindrical shields 10 in juxtaposed relation with the opposite ends of the cylindrical magnet 5 with a clearance between the innermost annular shields 10' and the opposite ends of the magnet 5. The annular shields 10' are spaced apart from one another a small distance.

Connected to the electrodes 9, 9 are wires 13, 13 respectively for transmitting to an amplifier and indicator section a DC voltage induced in the electrodes which is in linear proportion to the rate of flow of a liquid metal through the conduit 1.

Figure 3:
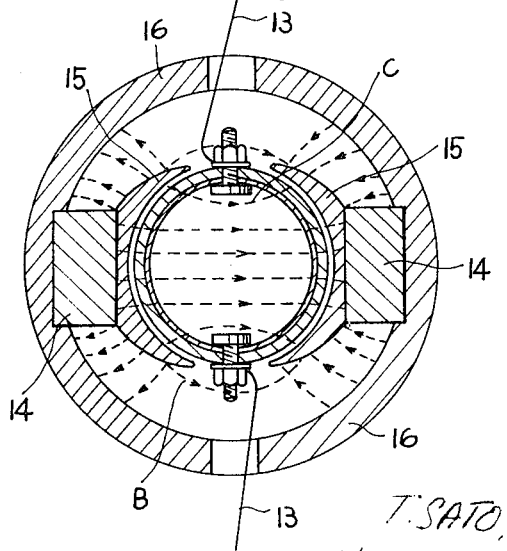
FIG. 3 is a longitudinal sectional view of a flowmeter of the prior art.

Heretofore, a conventional flowmeter of the permanent-magnet-type has generally consisted of magnetic steel members 14, 14, pole pieces 15 and yoke 16 as shown in FIG. 3. The flowmeter of this type has a disadvantage in that leakage flux B markedly reduces the density of main flux C. The provision of a uniform magnetic field requires the use of relatively large pole pieces 15, 15, which in turn causes a further reduction in the density of the main flux C. The conventional flowmeter of the type described is inevitably large in size and heavy in weight, and moreover it is high in cost in view of difficulty in working on and assembling parts.

The electromagnetic flowmeter according to this invention is very simple in construction because the cylindrical magnet 5 formed in one piece or two pieces is held by the nonmagnetic retainer frame 4. In spite of its simple construction, the flowmeter according to this invention produces a magnetic field having a high uniformity as shown by magnetic lines of force A in FIG. 2 and an intensity which is three to four times as high as the intensity of a magnetic field provided by a conventional magnetic flowmeter by using magnetic steel of the same kind.

The electrodes 9, 9 can be mounted readily in the openings 8, 8 drilled in the magnet 5. The present invention provides an electromagnetic flowmeter of high accuracy and precision which is compact in overall size, light in weight and low in cost.

Figure 4:
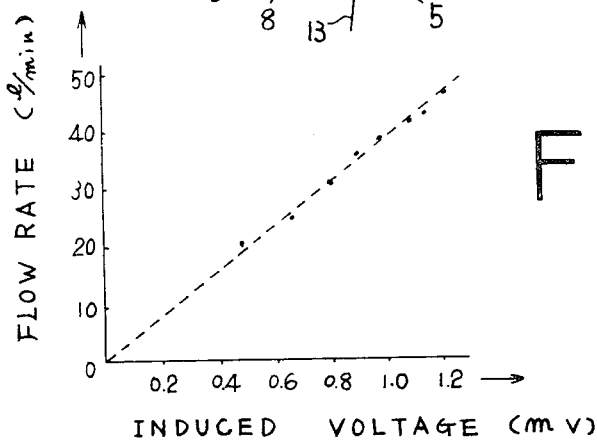
FIG. 4 is a diagram showing the relation between flow rate and produced voltage.

The electromagnetic flowmeter according to this invention has been used with electrolytic cells operated on a commercial basis. It has been ascertained that the DC voltage induced in the electrodes is in linear proportion to the flow rate of mercury, and that the value indicated by the meter is not influenced by variations in the external field. The black dots on or near a line in FIG. 4 have been obtained by plotting the values indicated by the electromagnetic flowmeter according to this invention as abscissae against the values of flow rate determined by an amalgam density measuring method.

From the foregoing description, it will be appreciated that the electromagnetic flowmeter of this invention has many advantages. The magnetic field formed by the permanent magnet of the electromagnetic flowmeter according to this invention is not affected by a highly intensive space magnetic field of several hundred Gausses which prevail in an installation for producing caustic soda by electrolysis of the mercury process, by virtue of the external magnetic field shield means. Thus, the meter can indicate values which are free from error. The flowmeter according to this invention is low in cost, compact in overall size, light in weight and durable. The output voltage of the flowmeter can be utilized for effecting flow control and operating a warning device. The magnet flowmeter according to this invention is thus of a great industrial value.

What is claimed is:

1. An electromagnetic flowmeter comprising a conduit of nonmagnetic material for passing therethrough a liquid to be measured, a permanent magnet of cylindrical shape mounted on the outer circumferential surface of said conduit in concentric relationship, two radial openings formed in two position diametrically opposed to each other on said permanent magnet in substantially the central portion axially of the magnet, two electrodes mounted in said two radial openings respectively, and external magnetic field shield means mounted around said permanent magnet in enclosing relationship.

2. An electromagnetic flowmeter as defined in claim 1 wherein said permanent magnet in cylindrical shape is formed in two pieces each in semicylindrical shape.

3. An electromagnetic flowmeter as defined in claim 1 wherein said external magnetic field shield means comprises a set of cylindrical shields and a set of annular shields, said cylindrical shields and said annular shields being arranged such that the cylindrical shields are concentric with said permanent magnet and the annular shields are disposed at opposite ends of the cylindrical shields, said shields being spaced apart from one another and from the permanent magnet by a small clearance.

* * * * *